United States Patent
Barish et al.

(10) Patent No.: US 11,009,604 B1
(45) Date of Patent: May 18, 2021

(54) METHODS FOR DETECTING IF A TIME OF FLIGHT (TOF) SENSOR IS LOOKING INTO A CONTAINER

(71) Applicant: ZEBRA TECHNOLOGIES CORPORATION, Lincolnshire, IL (US)

(72) Inventors: Justin F. Barish, Kings Park, NY (US); Adithya H. Krishnamurthy, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/779,477

(22) Filed: Jan. 31, 2020

(51) Int. Cl.
*G01S 17/04* (2020.01)
*G06Q 50/28* (2012.01)
*G06Q 10/08* (2012.01)
*H04N 13/204* (2018.01)

(52) U.S. Cl.
CPC .............. *G01S 17/04* (2020.01); *G06Q 10/08* (2013.01); *G06Q 50/28* (2013.01); *H04N 13/204* (2018.05)

(58) Field of Classification Search
None
See application file for complete search history.

(56) References Cited

U.S. PATENT DOCUMENTS

| | | | | |
|---|---|---|---|---|
| 8,848,201 B1* | 9/2014 | Bruce | | G01B 11/24 |
| | | | | 356/601 |
| 2013/0336581 A1* | 12/2013 | Datta | | G06K 9/4642 |
| | | | | 382/165 |
| 2016/0239795 A1* | 8/2016 | Burch | | G06K 7/10732 |
| 2018/0352198 A1* | 12/2018 | Raasch | | G06K 9/00771 |
| 2020/0234071 A1* | 7/2020 | Yuvaraj | | G06K 9/00664 |

* cited by examiner

*Primary Examiner* — Rebecca A Volentine
(74) *Attorney, Agent, or Firm* — Yuri Astvatsaturov

(57) ABSTRACT

Methods for detecting if a Time of Flight (ToF) sensor is looking into a container are disclosed herein. An example method includes capturing a three-dimensional image. The three-dimensional image may comprise three-dimensional point data having a plurality of points. The example method may further include analyzing the plurality of points to determine a plurality of image components. Each image component may be representative of the plurality of points. The example method may further include comparing each image component of the plurality of image components to a threshold value. Each image component may correspond to a respective threshold value. The example method may further include determining that a number of image components N of the plurality of image components satisfy the respective threshold values, and determining the presence or absence of the container by comparing the number of image components N to an agreement threshold X.

20 Claims, 8 Drawing Sheets

METHODS FOR DETECTING IF A TIME OF FLIGHT (TOF) SENSOR IS LOOKING INTO A CONTAINER

BACKGROUND

In the commercial shipping industry, Time of Flight (ToF) sensors are frequently used to analyze the interior of shipping containers. When a ToF sensor captures images of a container, certain properties are expected, such as 2 walls, a floor, a ceiling, and a back wall. However, when a ToF sensor captures images that do not feature a container interior, external sources of light (e.g., the sun) are able to reach the sensor, resulting in a saturated image. Moreover, if no container is present, the signals projected by the ToF sensor may not return to the sensor, producing in a "scatter effect" in the resulting image. These image distortions are detrimental to the analytics the ToF sensors are intended to perform.

Correspondingly, a major point of emphasis in the commercial shipping industry is accurately and efficiently determining whether a ToF sensor is looking into a container prior to image capture. Making this determination is a substantial challenge for traditional systems as traditional image analysis techniques are unable to consistently interpret scattered image data with high fidelity. A traditional system may readily confuse, for example, an empty parking lot with an empty container, or vice versa.

Accordingly, there is a need for methods and systems for quickly and accurately detecting whether a ToF sensor is looking into a container to facilitate consistent, reliable container analytics.

SUMMARY

In an embodiment, the present invention is a method for detecting a presence or an absence of a container. The method includes capturing a three-dimensional image, wherein the three-dimensional image comprises three-dimensional point data having a plurality of points. The method further includes analyzing the plurality of points to determine a plurality of image components, wherein each image component is representative of the plurality of points. The method further includes comparing each image component of the plurality of image components to a threshold value, wherein each image component corresponds to a respective threshold value. The method further includes determining that a number of image components N of the plurality of image components satisfy the respective threshold values. The method further includes determining the presence or the absence of the container by comparing the number of image components N to an agreement threshold X.

In a variation of this embodiment, analyzing the plurality of points to determine the plurality of image components further comprises iterating over the plurality of points to determine a number of points that are external to a boundary of the container. Further in this variation, comparing each image component of the plurality of image components to the threshold value further comprises comparing the number of points that are external to the boundary of the container to an external boundary threshold. Still further in this variation, determining that the number of image components N of the plurality of image components satisfy the respective threshold values further comprises determining that the number of points that are external to the boundary of the container is greater than or equal to the external boundary threshold.

In another variation of this embodiment, analyzing the plurality of points to determine the plurality of image components further comprises performing planar segmentation on the plurality of points to determine a height of a ground plane. Further in this variation, comparing each image component of the plurality of image components to the threshold value further comprises comparing the height of the ground plane to a height threshold. Still further in this variation, determining that the number of image components N of the plurality of image components satisfy the respective threshold values further comprises determining that the height of the ground plane is substantially similar to the height threshold.

In yet another variation of this embodiment, analyzing the plurality of points to determine the plurality of image components further comprises determining an amplitude for each point in the plurality of points to calculate an average amplitude of the plurality of points. Further in this variation, comparing each image component of the plurality of image components to the threshold value further comprises comparing the average amplitude to an amplitude threshold. Still further in this variation, determining that the number of image components N of the plurality of image components satisfy the respective threshold values further comprises determining that the average amplitude is less than the amplitude threshold.

In yet another variation of this embodiment, analyzing the plurality of points to determine the plurality of image components further comprises determining an ambient value for each point in the plurality of points to calculate an average ambient value of the plurality of points. Further in this variation, comparing each image component of the plurality of image components to the threshold value further comprises comparing the average ambient value to an ambient value threshold. Still further in this variation, determining that the number of image components N of the plurality of image components satisfy the respective threshold values further comprises determining that the average ambient value is less than the ambient value threshold.

In yet another variation of this embodiment, the method further includes determining either (i) that the number of image components N is greater than or equal to the agreement threshold X or (ii) that the number of image components N is less than the agreement threshold X. Further in this variation, and in response to determining that the number of image components N is greater than or equal to the agreement threshold X, the method further includes determining the absence of the container. Still further in this variation, and in response to determining that the number of image components N is less than the agreement threshold X, the method further includes determining the presence of the container.

In another embodiment, the present invention is a system for determining a presence or an absence of a container. The system includes a user interface and a trailer monitoring unit (TMU). The TMU is mounted proximate a loading bay and communicatively connected with the user interface. The TMU includes a housing and an imaging assembly. The imaging assembly is at least partially within the housing and is configured to capture a three-dimensional image. The three-dimensional image comprises three-dimensional point data having a plurality of points. The TMU is configured to analyze the plurality of points to determine a plurality of image components, wherein each image component is representative of the plurality of points. The TMU is further configured to compare each image component of the plurality of image components to a threshold value, wherein each image component corresponds to a respective threshold value. The TMU is further configured to determine that a number of image components N of the plurality of image components satisfy the respective threshold values. The TMU is further configured to determine the presence or absence of the container by comparing the number of image components N to an agreement threshold X.

In a variation of this embodiment, the TMU is further configured to analyze the plurality of points to determine the plurality of image components by iterating over the plurality of points to determine a number of points that are external to a boundary of the container. Further in this variation, the TMU is configured to compare each image component of the plurality of image components to the threshold value by comparing the number of points that are external to the boundary of the container to an external boundary threshold. Still further in this variation, the TMU is configured to determine that the number of image components N of the plurality of image components satisfy the respective threshold values by determining that the number of points that are external to the boundary of the container is greater than or equal to the external boundary threshold.

In another variation of this embodiment, the TMU is further configured to analyze the plurality of points to determine the plurality of image components by performing planar segmentation on the plurality of points. Further in this variation, the TMU is configured to determine a height of a ground plane resulting from the planar segmentation, and compare each image component of the plurality of image components to the threshold value by comparing the height of the ground plane to a height threshold. Still further in this variation, the TMU is configured to determining that the number of image components N of the plurality of image components satisfy the respective threshold values further comprises determining that the height of the ground plane is substantially similar to the height threshold.

In yet another variation of this embodiment, the TMU is further configured to analyze the plurality of points to determine the plurality of image components by determining an amplitude for each point in the plurality of points. Further in this variation, the TMU is configured to calculate an average amplitude of the plurality of points, and compare each image component of the plurality of image components to the respective threshold value by comparing the average amplitude to an amplitude threshold. Still further in this variation, the TMU is configured to determine that the number of image components N of the plurality of image components satisfy the respective threshold values by determining that the average amplitude is less than the amplitude threshold.

In yet another variation of this embodiment, the TMU is further configured to analyze the plurality of points to determine the plurality of image components by determining an ambient value for each point in the plurality of points. Further in this variation, the TMU is configured to calculate an average ambient value of the plurality of points, and compare each image component of the plurality of image components to the respective threshold value by comparing the average ambient value to an ambient value threshold. Still further in this variation, the TMU is configured to determine that the number of image components N of the plurality of image components satisfy the respective threshold values by determining that the average ambient value is less than the ambient value threshold.

In yet another variation of this embodiment, the TMU is further configured to determine either (i) that the number of image components N is greater than or equal to the agreement threshold X or (ii) that the number of image components N is less than the agreement threshold X. Further in this variation, and in response to determining that the number of image components N is greater than or equal to the agreement threshold X, the TMU is configured to determine the absence of the container. Still further in this variation, and in response to determining that the number of image components N is less than the agreement threshold X, the TMU is configured to determine the presence of the container.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
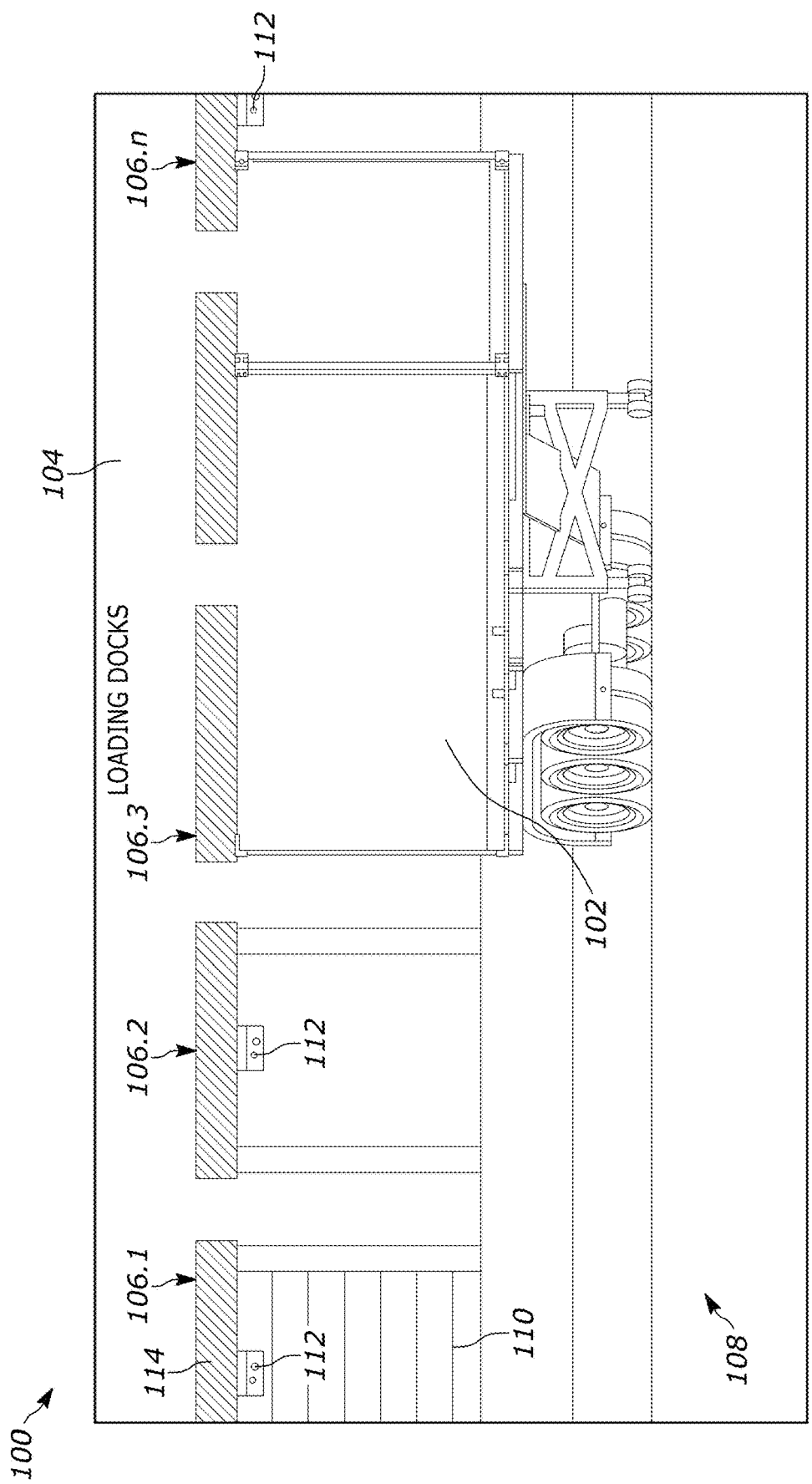
FIG. 1A illustrates a loading facility, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, shipping companies seek to accurately and efficiently analyze the load status of each container for which they are responsible. Many companies incorporate imaging systems to provide this analysis (e.g., trailer monitoring units (TMUs)). However, these traditional imaging systems suffer from a number of drawbacks, such as being unable to effectively determine whether a container is present within the system's field of view (FOV).

Consequently, the methods/systems of the present disclosure provide solutions to the container presence determination problems associated with the traditional imaging systems. Namely, a method of the present disclosure may include capturing a three-dimensional image, wherein the three-dimensional image comprises three-dimensional point data having a plurality of points. The method may further include analyzing the plurality of points to determine a plurality of image components, wherein each image component is representative of the plurality of points. The method may further include comparing each image component of the plurality of image components to a threshold value, wherein each image component corresponds to a respective threshold value. The method may further include determining that a number of image components N of the plurality of image components satisfy the respective threshold values, such that the method may determine the presence or the absence of the container by comparing the number of image components N to an agreement threshold X.

FIG. 1A illustrates an exemplary environment where embodiments of the present invention may be implemented. In the present example, the environment is provided in a form of a loading dock 100 (also referred to as a loading facility) where containers 102 are loaded with various goods and/or where various goods are unloaded from the containers 102. The loading dock 100 is comprised of a facility 104 having a plurality of loading bays 106.1-106.$n$ facing a loading facility lot 108 where vehicles, such as semis (not shown), deliver and pick up containers 102. To be loaded, each trailer 102 is backed toward the facility 104 such that it is generally perpendicular with the wall having the plurality of loading bays 106.1-106.$n$, and in line with one of the loading bays (in this case 106.3). As illustrated, each respective loading bay of the plurality of loading bays 106.1-106.$n$ includes a bay door 110 that can be lowered to close the respective loading bay or raised to open the respective loading bay allowing the interior of the facility 104 to be accessible therethrough. Additionally, each respective loading bay is provided with a respective TMU 112. The respective TMU 112 is mounted near the trailer 102 loading area, preferably in the upper section of the respective loading bay outside the door 110 facing the loading facility lot 108 or an interior/rear of a trailer 102 if one is docked at the respective loading bay. To protect the respective TMU 112 from inclement weather, it could be mounted under a bay awning 114. Once docked, goods can be loaded onto/unloaded from the trailer 102 with the respective TMU 112 maintaining a view of the rear/inside of the trailer 102.

Figure 1B:
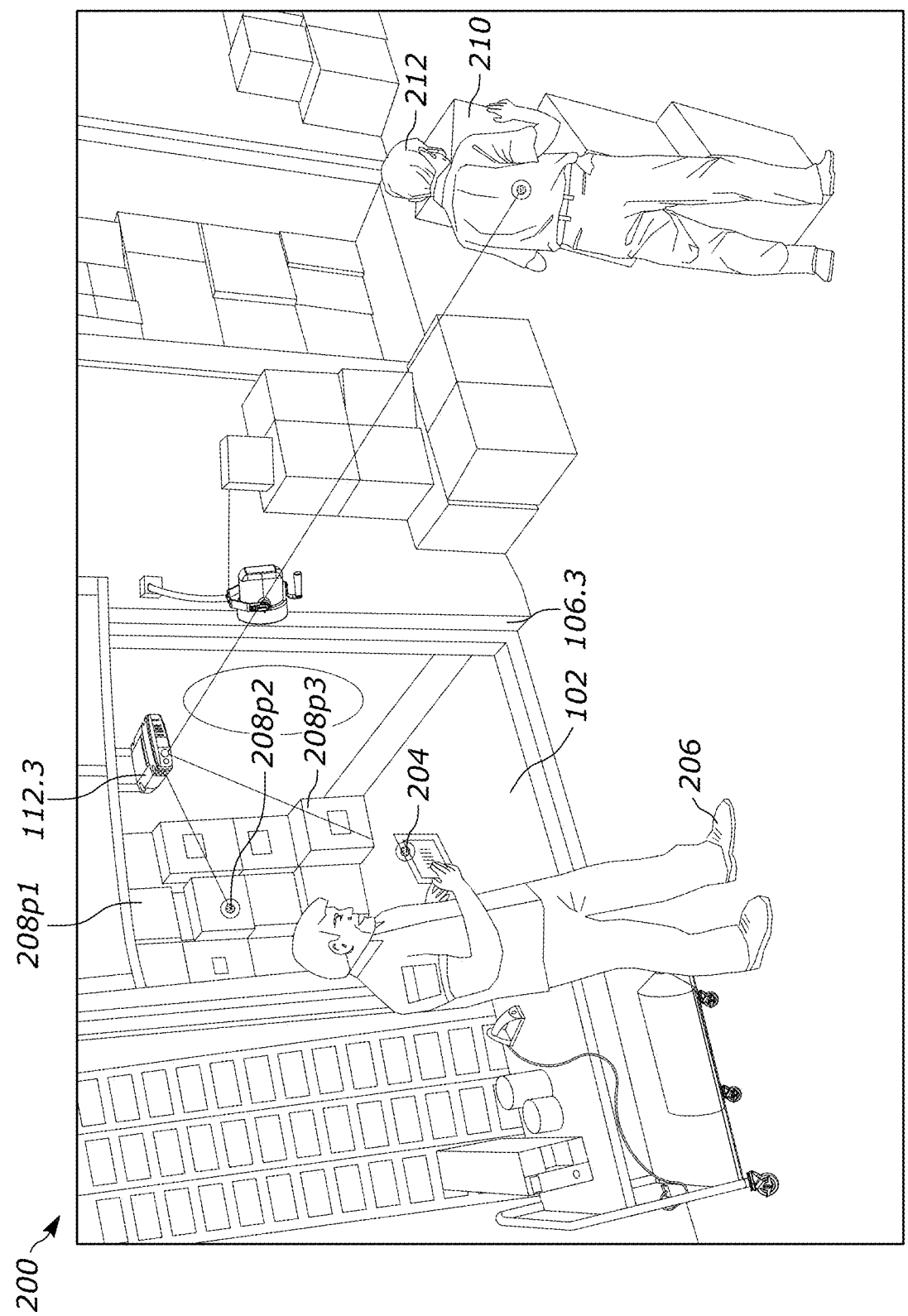
FIG. 1B illustrates an interior of the loading facility of FIG. 1A.

FIG. 1B is a perspective view 200 of the loading facility 100 of FIG. 1A depicting trailer 102 docked at a loading bay 106.3, in accordance with example embodiments herein. For example, FIG. 1B depicts trailer 102, which in the embodiment of FIG. 1B is an interior view of the trailer 102 of FIG. 1A. FIG. 1B also depicts loading bay 106.3, which in the embodiment of FIG. 1B is an interior view of the loading bay 106.3 of FIG. 1A. As depicted in FIG. 1B, trailer 102 is docked with loading bay 106.3 exposing the interior of trailer 102 to the interior of loading facility 100. Trailer 102 includes packages, boxes, and/or other transportable objects or goods, including packages 208$p$1-208$p$3. The packages 208$p$1-208$p$3 may be in a state of being loaded or unloaded into trailer 102. For example, worker 212 may be in a state of loading or unloading additional packages 210 into or out of trailer 102. In some embodiments, manager 206 may oversee, assist, or otherwise additionally facilitate the loading or unloading packages, boxes, and/or other transportable objects or goods (e.g., packages 208$p$1-208$p$3 or 210) into or out of the trailer 102. For example, manager 206 may utilize a dashboard app executing on client device 204 as described herein.

FIG. 1B also depicts a TMU 112.3. TMU 112.3 may include one or more processors and one or more computer memories for storing image data, and/or for executing apps that perform analytics or other functions as described herein. In various embodiments, and as shown in FIG. 1B, the TMU 112.3 may be mounted within loading facility 100 and oriented in the direction of trailer 102 to capture 3D and/or 2D image data of the interior of trailer 102. For example, as shown in FIG. 1B, TMU 112.3 may be oriented such that the 3D and 2D cameras of TMU 112.3 look down the length of the trailer 102 so that TMU 112.3 may scan or sense the walls, floor, ceiling, packages (e.g., 208$p$1-208$p$3 or 210), or other objects or surfaces with trailer 102 to determine the 3D and 2D image data. The image data may be processed by the one or more processors and/or memories of the TMU 112.3 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 112.3 may process the 3D and 2D image data, as scanned or sensed from the 3D-depth camera and photo-realistic camera, for use by other devices (e.g., client device 204). For example, the one or more processors and/or one or more memories of the TMU 112.3 may process the image data scanned or sensed from trailer 102. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server for storage or for further manipulation.

As shown in FIG. 1B, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208$p$1-208$p$3 or 210), as described herein. In some embodiments, the dashboard app may receive the image data and/or the post-scanning data and display such data in real-time. Client device 204 may be a mobile device, such as a tablet, smartphone, laptop, or other such mobile computing device. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server. In such embodiments, the server may generate post-scanning data that may include metadata, simplified data, normalized data, result data, status data, or alert data as determined from the original scanned or sensed image data provided by the TMU 112.3. As described herein, the server may store such data, and may also send the image data and/or the post-scanning data to a dashboard app, or other app, implemented on a client device, such as the dashboard app implemented on client device 204 of FIG. 1B.

Figure 2:
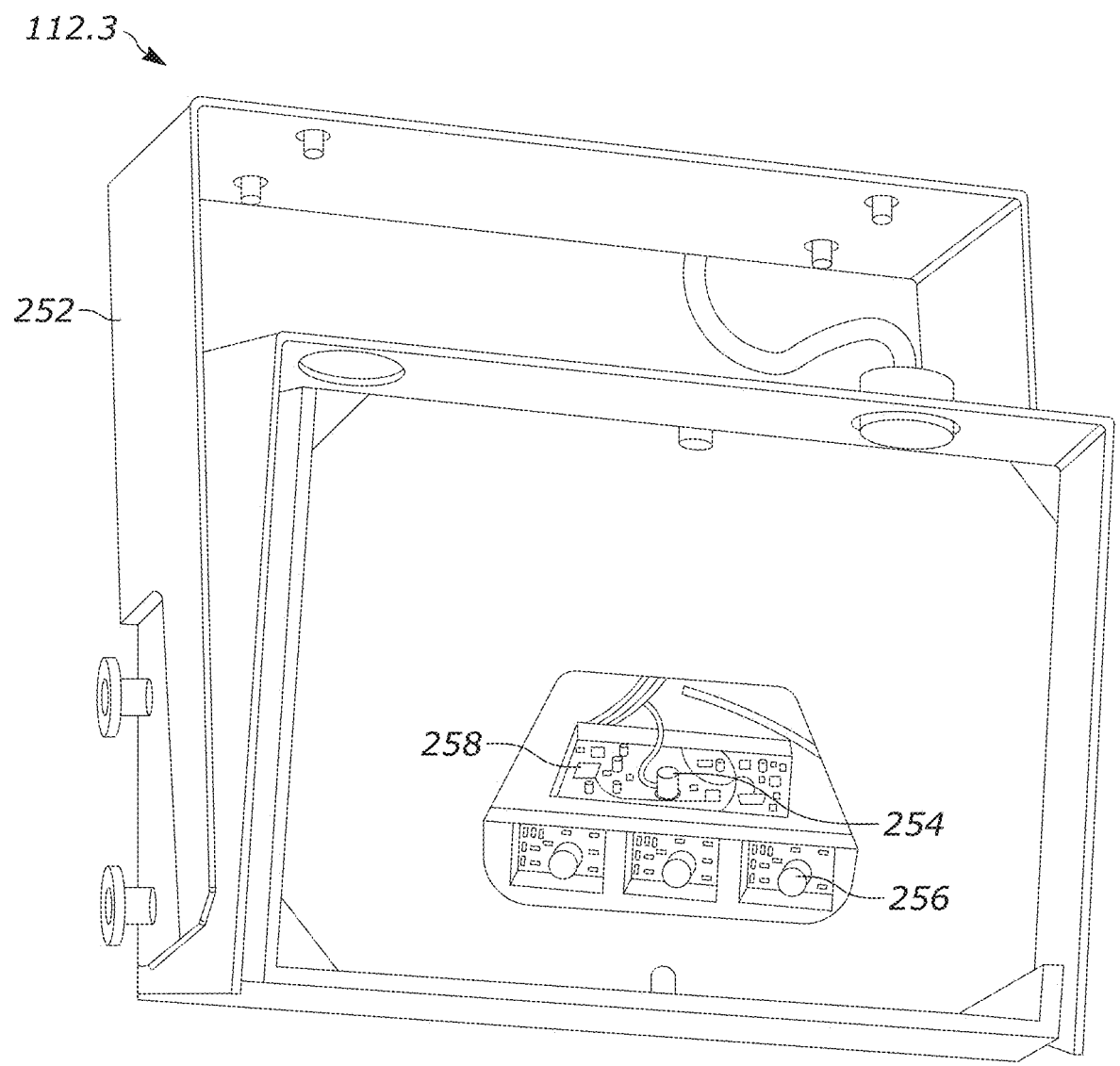
FIG. 2 illustrates a trailer monitoring unit (TMU), in accordance with embodiments described herein.

In the currently described embodiment and as shown in FIG. 2, the TMU 112.3 is a mountable device that includes a mounting bracket 252 for orienting or otherwise positioning the TMU 112.3 within a loading facility (e.g., loading facility 100). The TMU 112.3 may further include one or more processors and one or more memories for processing image data as described herein. For example, the TMU 112.3 may include flash memory used for determining, storing, or otherwise processing the imaging data/datasets and/or post-scanning data. In addition, TMU 112.3 may further include a network interface to enable communication with other devices.

TMU 112.3 may include a 3D camera 254 (also referenced herein as a "Time-of-Flight (ToF) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., loading dock 106.3) or objects within the predefined search area, such as boxes or packages (e.g., packages 208p1-208p3) and trailer 102. The IR light or beams may be distributed on the object or surface in a pattern of dots or points by the IR projector, which may be sensed or scanned by the IR camera. A depth-detection app, such as a depth-detection app executing on the one or more processors or memories of TMU 112.3, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 112.3 to generate a depth map. The depth map may represent a 3D image of, or contain 3D image data of, the objects or surfaces that were sensed or scanned by the 3D camera 254, for example, the trailer 102 and any objects, areas, or surfaces therein. The 3D camera 254 may also be configured to capture other sets of image data in addition to the 3D image data, such as grayscale image data, ambient image data, amplitude image data, and/or any other suitable image data or combination thereof.

TMU 112.3 may further include a photo-realistic camera 256 for capturing, sensing, or scanning 2D image data. The photo-realistic camera 256 may be a RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the TMU 112.3 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. Consequently, the captured 2D images and the corresponding 2D image data may be depth-aligned with the 3D images and 3D image data.

TMU 112.3 may also include a processing board 258 configured to, for example, perform container fullness estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

Figure 3:
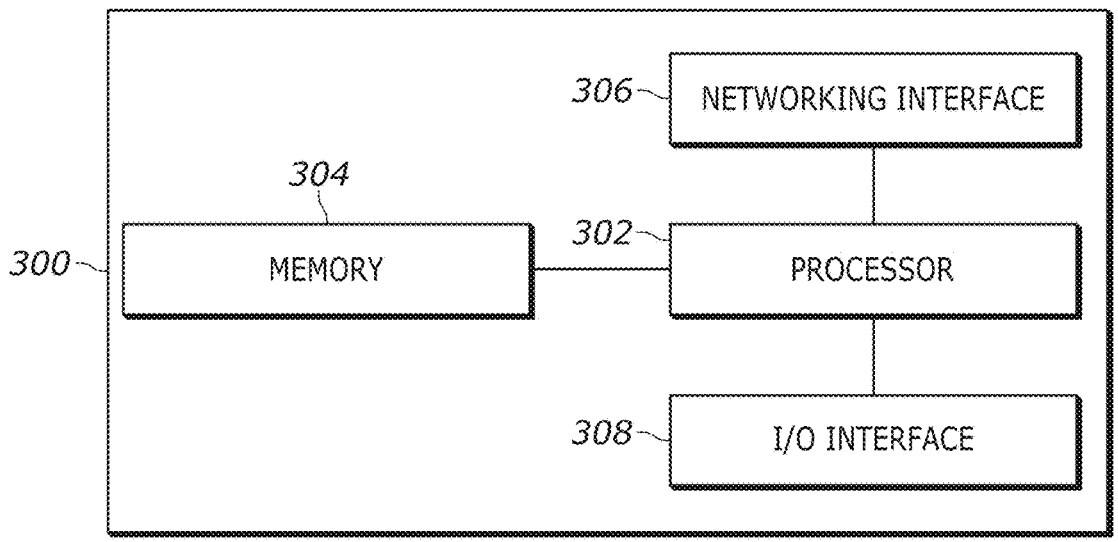
FIG. 3 is a block diagram of an example logic circuit for implementing example methods and/or operations described herein.

FIG. 3 is a block diagram representative of an example logic circuit capable of implementing, for example, one or more components of the example processing board 258 of FIG. 2 or, more generally, the example TMU 112.3 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 308 to enable receipt of user input and communication of output data to the user. Such user input and communication may include, for example, any number of keyboards, mice, USB drives, optical drives, screens, touchscreens, etc.

Figure 4:
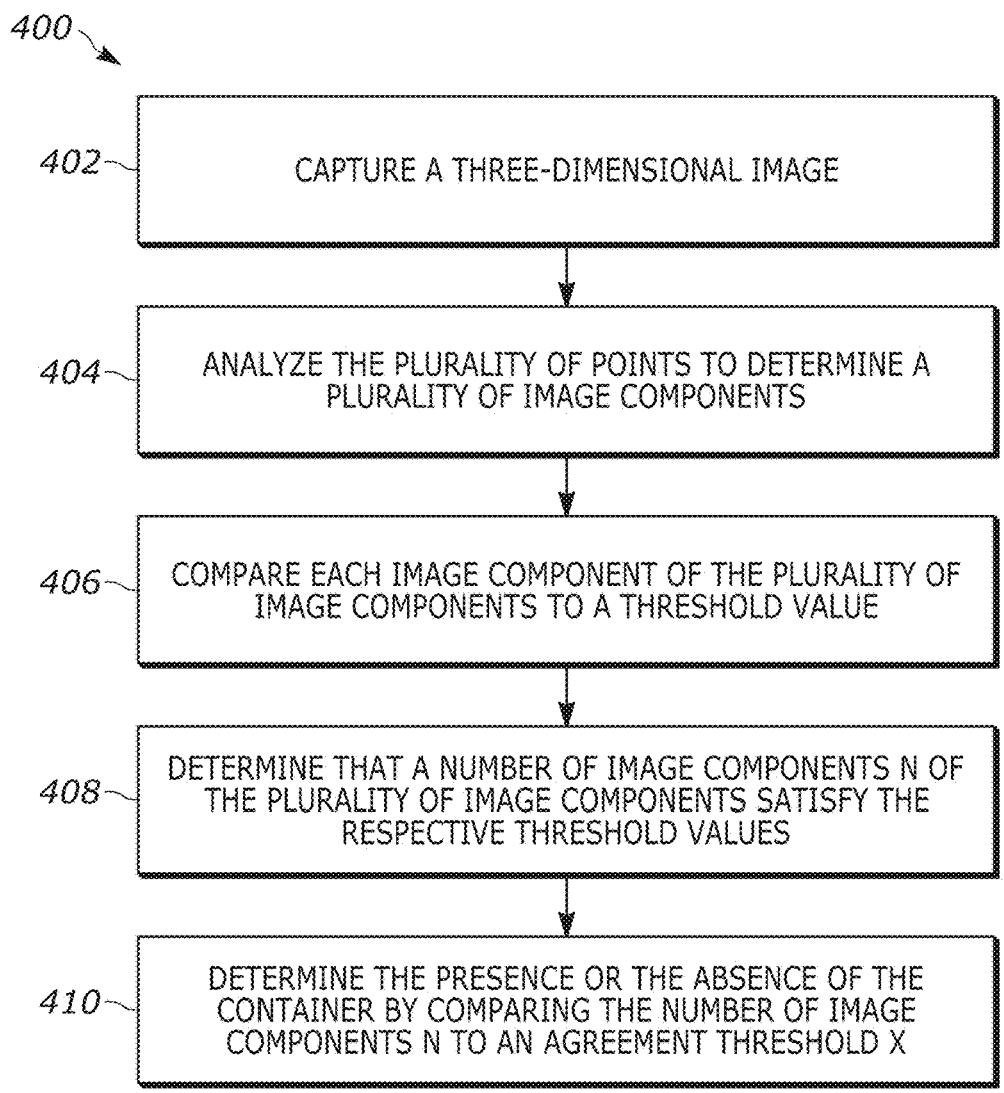
FIG. 4 is a flowchart representative of a method for detecting a presence or an absence of a container, in accordance with embodiments described herein.

FIG. 4 is a flowchart representative of a method 400 for detecting a presence or an absence of a container (e.g., trailer 102), in accordance with embodiments described herein. Method 400 describes a variety of embodiments, and several specific embodiments are described in reference to FIGS. 5A, 5B, 6, and 7. Generally speaking, the method 400 includes capturing a three-dimensional image, as depicted in each of FIGS. 5A, 5B, and 6. The method 400 then includes analyzing the three-dimensional images to determine image components indicative of a presence or absence of a container, as indicated by the technique illustrated in FIG. 7.

Figure 5A:
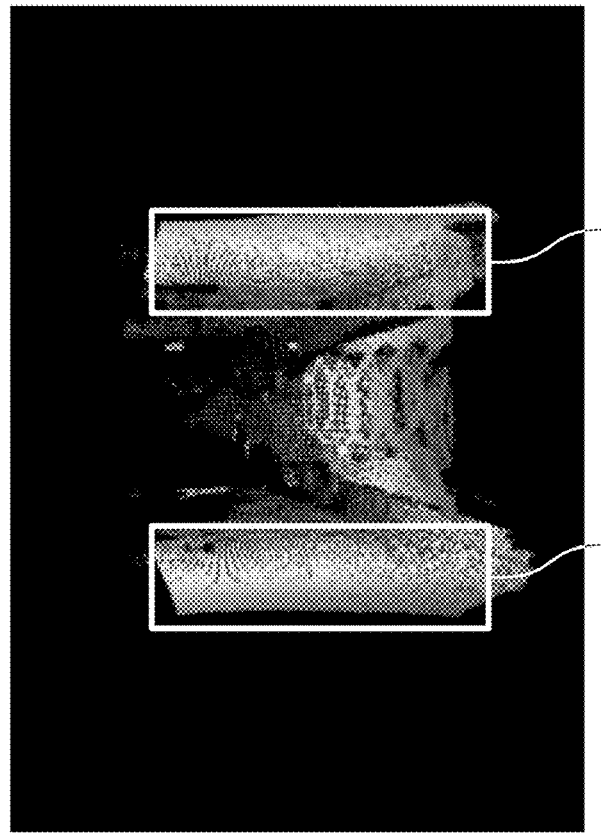
FIG. 5A depicts a red-green-blue (RGB) image and a 3-D depth image of an interior of a container used to facilitate example methods and/or operations described herein.
Figure 5A:
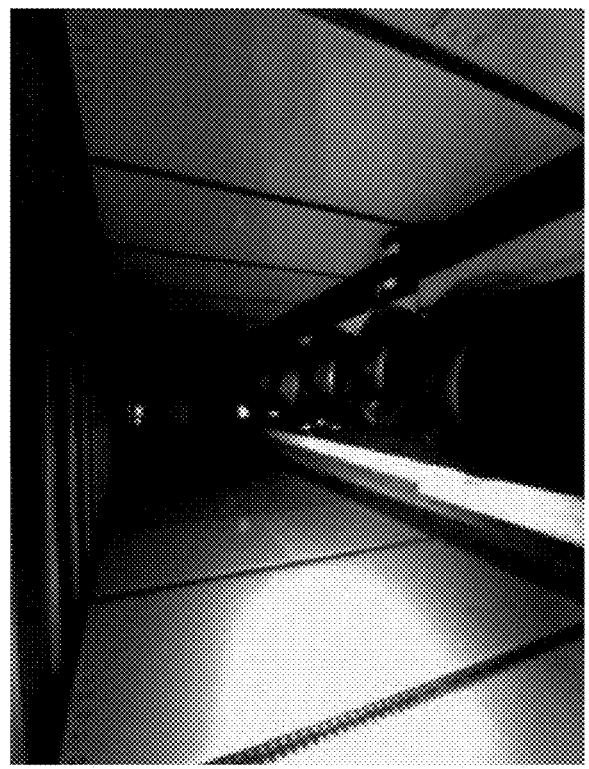

The method 400 begins by capturing a three-dimensional image (block 402). A 3D camera (e.g., 3D camera 254) may capture the three-dimensional image, such that the image may comprise three-dimensional point data having a plurality of points. The 3D camera may capture the three-dimensional image in response to a command provided by an operator, and/or upon suspected detection of the presence of a container. For example, a TMU (e.g., TMU 112.3) including a 3D camera may detect when a bay door 110 of FIG. 1A is raised, or may receive a control command from an operator instructing the TMU to capture an image of the associated loading bay (e.g., loading bay 106.3). The TMU may then capture, for example, a RGB trailer image 500 and a 3D trailer image 502, as illustrated in FIG. 5A. The TMU may capture the RGB trailer image 500 using a RGB camera (e.g., photo-realistic camera 256), and the RGB trailer image 500 may provide a RGB representation of the interior of a trailer parked at a loading bay. The 3D trailer image 502 may similarly represent the interior of the trailer parked at the loading bay, but it may include three-dimensional point data having a plurality of points that correspond to the interior of the trailer. For example, the 3D trailer image 502 may include a set of points representing a left trailer wall 504 and a set of points representing a right trailer wall 506. It should be understood that the TMU may capture any number of images of any suitable type upon detecting and/or otherwise executing instructions to capture an image. Block 402 may be performed by, for example, the 3D camera 254 of FIG. 2.

Figure 5B:
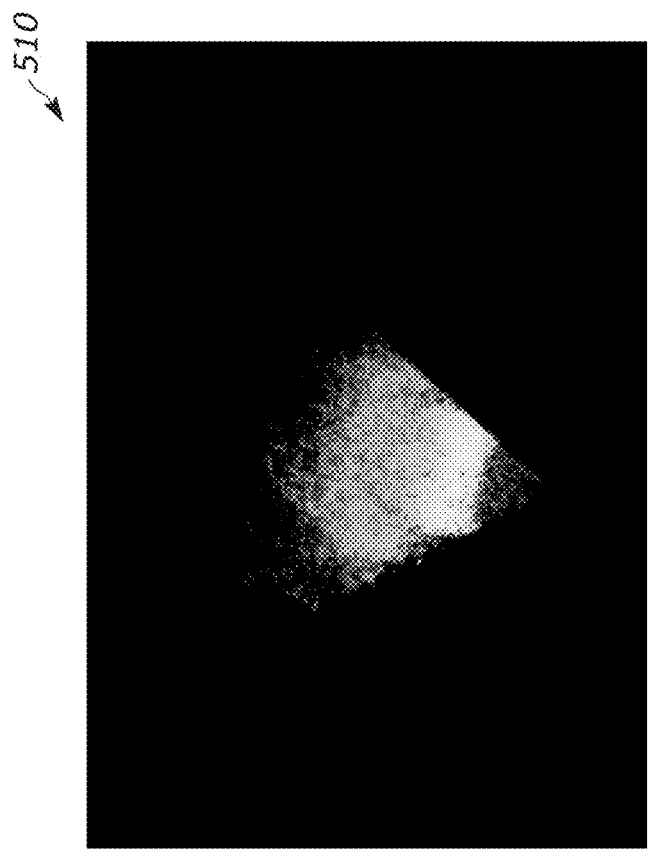
FIG. 5B depicts a RGB image and a 3-D depth image representative of an unoccupied loading bay within, for example, the loading facility of FIG. 1A used to facilitate example methods and/or operations described herein.
Figure 5B:
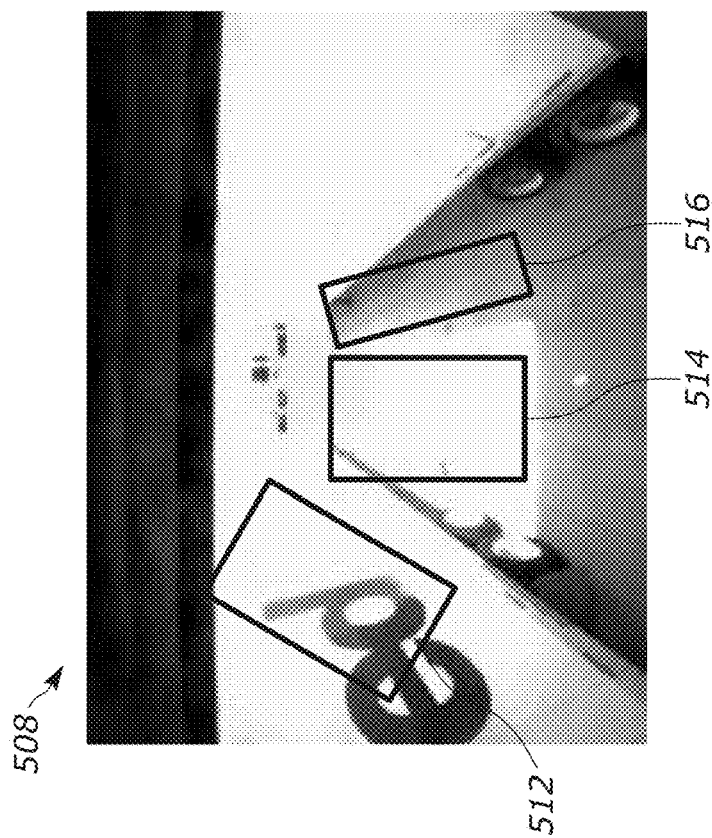

As another example, the TMU may capture an image of a loading bay without a trailer present. A semi-truck, forklift, or other vehicle may remove the trailer/container from the FOV of the TMU before the TMU detects or otherwise executes instructions to stop capturing images of the loading area. In accordance with this example, and as illustrated in FIG. 5B, the TMU may incorrectly detect the presence of a trailer or otherwise execute instructions to capture a RGB image 508 and/or a 3D image 510 of a loading bay. These images (508, 510) may represent an external area of a loading dock (e.g., loading facility 100). The RGB image 508, for example, may include one or more areas 512, 514, and 516, that each feature a different amount of ambient light (e.g., sunlight). The 3D image 510 may include three-dimensional point data having a plurality of points, but the plurality of points may collectively form a scatter pattern indicative of no return signals to the 3D camera.

Problematically, the scenario presented by FIG. 5B may result in a TMU executing conventional analytics techniques to determine the presence of a container, and perform analytics associated therewith. Typically, the scatter pattern represented by the 3D image 508 includes dense groupings of points. The TMU may select a dense group of points that are planar within the scatter pattern of the 3D image 510, and misinterpret that group of points as a floor plane, a wall plane, and/or any other plane of a trailer. The TMU may then analyze the remaining points of the scatter pattern as boxes, loaders, etc., such that the TMU may determine the scatter pattern to represent a partially or fully loaded trailer. Such an erroneous determination may, for example, skew aggregate statistics maintained by a shipping company related to load metrics, resulting in customer and internal confusion related to the unintelligible data produced by the faulty analytics. Moreover, performing analytics based on the erroneous determination of the presence of a container may waste processing time and power of the TMU system.

Thus, the method 400 continues by analyzing the plurality of points to determine a plurality of image components (block 404). Each image component may be representative of the plurality of points. More specifically, the plurality of image components may represent qualities of the plurality of points, such as signal amplitude, depth, planar height, ambient values, etc. Each image component of the plurality of image components may be a quality of each individual point in the plurality of points, an aggregate quality of the plurality of points, and/or any combination thereof. Block 404 may be performed by, for example, the processing board 258 of FIG. 2.

In embodiments, block 404 further includes iterating over the plurality of points to determine a number of points that are external to a boundary of the container. The TMU may access, determine, and/or otherwise utilize established boundaries of a container to facilitate association techniques described in this embodiment. For example, the TMU may access these boundaries via internal memory (e.g., memory 304), retrieve the boundaries from an external source (e.g., an external server via networking interface 306), determine the boundaries based on preprocessing or otherwise analyzing the plurality of points, and/or any other suitable technique or combination thereof.

Generally, the boundaries of the container may establish coordinate value and depth value pairs representing the boundaries of the container (e.g., side walls, ceiling, floor, back wall). The TMU may determine coordinate values and depth values for each point in the plurality of points based on the signals received by the ToF sensor. The coordinate values may represent the position of the each point in the plurality of points with respect to a coordinate system overlaying the FOV of the ToF sensor (e.g., a Cartesian coordinate system overlay). The depth values may correspond to distances from the ToF sensor to the physical location represented by the associated point, and the TMU may associate certain coordinate and depth values with objects expected to exist at the physical location.

For example, and as illustrated in the 3D trailer image 502, the ToF sensor may associate collinear points at the edges of the ToF sensor FOV, such as the set of points representing the left trailer wall 504 and the set of points representing the right trailer wall 506 with walls of a trailer. Similarly, the ToF sensor may associate a plurality of points with substantially similar near-field (e.g., shallow, close, etc.) depth values across the FOV of the ToF sensor with a door of the trailer.

Accordingly, in these embodiments, the TMU may iterate over the plurality of points to determine a number of points that are external to a boundary of the container by comparing the coordinate values and depth values of each point in the plurality of points to the coordinate values and depth values of the boundaries of the container. For example, assume a first point in the set of points representing the right trailer wall 506 includes coordinate values and a depth value indicating the first point is further to the right at the respective depth than the corresponding point associated with the boundaries of the container. In this situation, the TMU may determine that the first point is outside the boundary of the container because the first point is initially included in the set of points representing the right trailer wall 506, but is located further to the right than the expected boundary location of the container. It is to be understood that the TMU or other suitable processor may not necessarily associate the point determined to be outside the boundary of the container (in this example, the "first point") with an object within the container (e.g., the set of points representing the right trailer wall 506) prior to determining the point is external to the container boundaries. Thus, in these embodiments, the plurality of image components may include the number of points that are external to a boundary of the container.

In embodiments, block 404 further includes performing planar segmentation on the plurality of points to determine a height of a ground plane. Generally, the TMU may perform planar segmentation in an attempt to identify various planes within a container interior that may correspond to the various boundaries of the container (e.g., side walls, ceiling, floor, back wall). The TMU may associate coplanar groups of points, and thereafter assign boundary designations to the coplanar groups of points based on the coordinate values and depth values comprising the coplanar groups of points.

For example, and in reference to the 3D trailer image 502, the TMU may determine that elements 504 and 506 comprise a substantial number of coplanar points. Once the TMU associates the coplanar points comprising elements 504 and 506, the TMU may further analyze the coordinate values and depth values comprising the elements 504, 506. The TMU may then determine that the coordinate values and depth values of element 504 indicate a substantially vertical plane along a left side of the ToF sensor FOV. Similarly, the TMU may determine that the coordinate values and depth values of element 506 indicate a substantially vertical plane along a right side of the ToF sensor FOV. Finally, the TMU may utilize these respective indications (e.g., substantially vertical plane along a left/right side of the ToF sensor FOV) to assign the elements 504, 506 to be the set of points representing the left trailer wall 504 and the set of points representing the right trailer wall 506.

Accordingly, the TMU may analyze a 3D image captured by the ToF sensor (e.g., 502, 510) and perform planar segmentation to identify a ground plane within the image. Specifically, the TMU may analyze a 3D image captured by the ToF sensor to identify a group of coplanar points with coordinate values and depth values indicating a substantially horizontal plane extending across the ToF sensor FOV. Moreover, the TMU may compare the coordinate values to the depth values for each group of coplanar points to determine a height value for each identified plane, including the ground plane. The height value for each identified plane may indicate a distance from the TMU to the identified plane. Thus, the ground plane may have a larger height value than other groups of coplanar points because the ground plane may be further from the TMU than the other groups of coplanar points. In practice, the TMU may identify ground planes that extend across the entire ToF sensor FOV, or any suitable portion of the ToF sensor FOV. For example, as illustrated in the 3D trailer image 502, a trailer may be of a drop-frame configuration, such that the "floor" of the trailer may consist of multiple height values.

As another example, and as depicted by the RGB image 508, the ToF sensor may capture an image when no container is present, such that the 3D image 510 represents an open parking lot area. In this situation, when the TMU attempts to perform planar segmentation and identify a ground plane, the TMU may determine the ground plane corresponds to the surface of the parking lot area. Thus, the TMU may determine the height of the ground plane of the container to correspond to the height of the surface of the parking lot area. In any event, in these embodiments, the plurality of image components may include the height of the ground plane.

In embodiments, block 404 further includes determining an amplitude for each point in the plurality of points to calculate an average amplitude of the plurality of points. In addition to coordinate values and depth values, each point captured by the ToF sensor may include an amplitude value. Generally speaking, the amplitude value may represent the strength of the returning signal received by the ToF sensor corresponding to each point. As an example, and in reference to FIG. 6, the amplitude image 600 includes the areas (512, 514, 516), and each area (512, 514, 516) may represent groups of points with different amplitude values. Specifically, the points included in areas 512 and 514 may have high amplitude values indicating that the strength of the returning signal received by the ToF sensor is relatively high. By contrast, the points included in area 516 may have low amplitude values indicating that the strength of the returning signal received by the ToF sensor is relatively low.

Accordingly, the TMU may analyze each point in the plurality of points to determine an amplitude value for each point, and may then take the average of all amplitude values to calculate the average amplitude of the plurality of points. It is to be appreciated that the TMU may calculate any suitable amplitude value based on any portion of the plurality of points. For example, the TMU may calculate average amplitude values for each identified plane of the 3D image, as previously described, and then calculate an aggregate average amplitude value using the amplitude values for each identified plane. Moreover, the TMU may calculate a mean, median, mode, weighted average, and/or any other suitable mathematical quantity or combination thereof to represent the average amplitude of the plurality of points. In any event, in these embodiments, the plurality of image components may include the average amplitude of the plurality of points.

In embodiments, block 404 further includes determining an ambient value for each point in the plurality of points to calculate an average ambient value of the plurality of points. The ambient value may represent the strength of any ambient light source received by the ToF sensor corresponding to each point. Generally, the ambient value corresponding to a respective point may bear an inverse relationship to a RGB value for the respective point. The RGB value for a respective point may, for example, indicate a color and brightness for the respective point, such that the ambient value for the respective point may be a grayscale negative representation of the RGB value. Hence, respective points with a high saturation in a RGB image (e.g., RGB image 508) may have a relatively low ambient value in an ambient image (e.g., ambient image 602).

Figure 6:
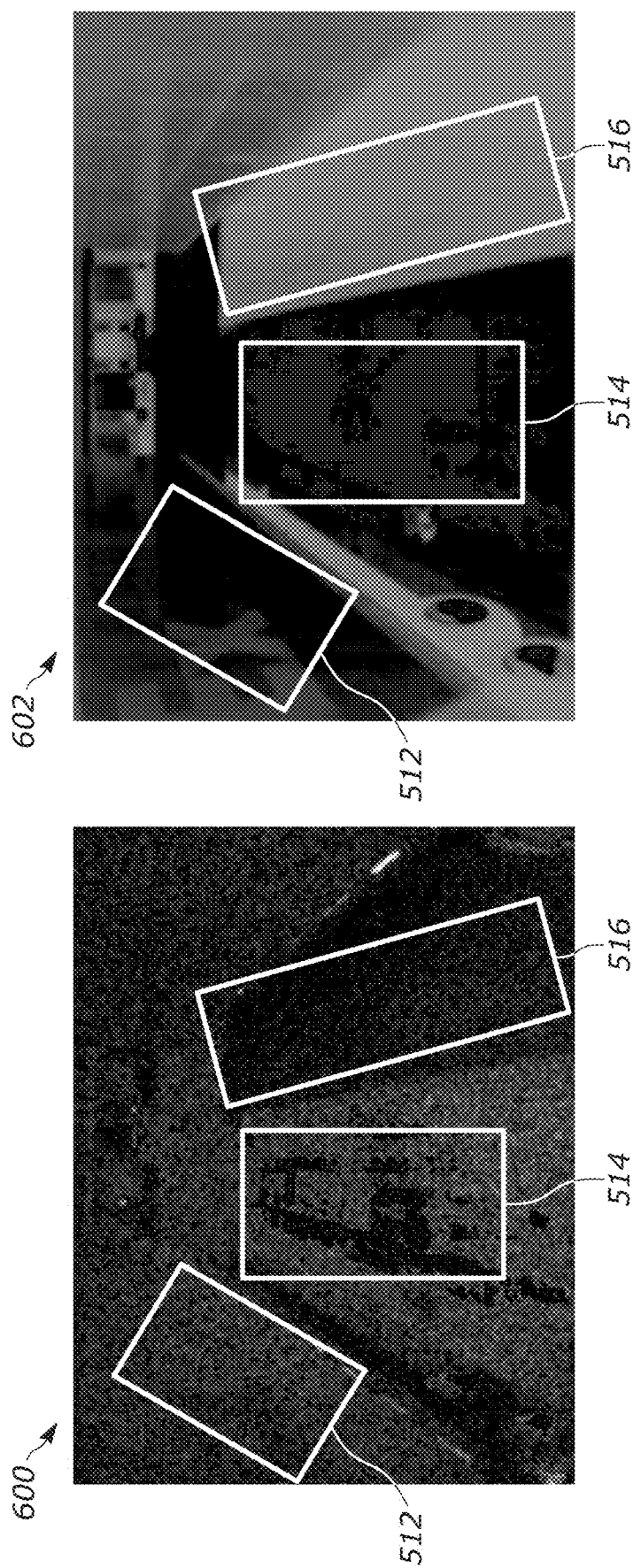
FIG. 6 depicts an amplitude image and an ambient image corresponding to the images of FIG. 5B used to facilitate example methods and/or operations described herein.

Thus, in reference to FIG. 6, an ambient image 602 may include the areas (512, 514, 516), and each area (512, 514, 516) may represent groups of points with different ambient values. Specifically, the points included in areas 512 and 514 may have low ambient values indicating the amount of external light (e.g., sunlight) received by the ToF sensor is relatively high. By contrast, the points included in area 516 may have high ambient values indicating that the amount of external light received by the ToF sensor is relatively low.

Accordingly, the TMU may analyze each point in the plurality of points to determine an ambient value for each point, and may then take the average of all ambient values to calculate the average ambient value of the plurality of points. It is to be appreciated that the TMU may calculate any suitable ambient value based on any portion of the plurality of points. For example, the TMU may calculate average ambient values for each identified plane of the 3D image, as previously described, and then calculate an aggregate average ambient value using the ambient values for each identified plane. Moreover, the TMU may calculate a mean, median, mode, weighted average, and/or any other suitable mathematical quantity or combination thereof to represent the average ambient value of the plurality of points. In any event, in these embodiments, the plurality of image components may include the average ambient value of the plurality of points.

The method 400 continues by comparing each image component of the plurality of image components to a threshold value (block 406). Each image component of the plurality of image components may correspond to one threshold value, such that any respective threshold value is compared to one respective image component. For example, and as illustrated by the flowchart 700 of FIG. 7, the plurality of image components may include a first image component 702a, a second image component 702b, a third image component 702c, and up to a $K^{th}$ image component 702k, where K may represent any number greater than or equal to 2. Correspondingly, the flowchart 700 may include a first threshold value 704a, a second threshold value 704b, a third threshold value 704c, and up to a $K^{th}$ threshold value 704k, where K may represent the identical number referenced by the $K^{th}$ image component 702k that is greater than or equal to 2. Block 406 may be performed by, for example, the processing board 258 of FIG. 2.

Thus, and as indicated in the flowchart 700, each respective image component may be compared to the corresponding respective threshold value. Namely, the TMU, for example, may compare the first image component 702a to the first threshold value 704a, the second image component 702b to the second threshold value 704b, the third image component 702c to the third threshold value 704c, and every remaining image component to the respective threshold value until the TMU compares the $K^{th}$ image component 702k to the $K^{th}$ threshold value 704k.

In embodiments, block 406 further includes comparing the number of points that are external to a boundary of the container to an external boundary threshold. For example, in embodiments where the TMU may determine a number of points that are external to a boundary of the container, the TMU may compare this number of points to the external boundary threshold. The external boundary threshold may be a pre-configured threshold that the TMU stores in memory (e.g., memory 304), receives from an external source (e.g., via networking interface 306), and/or otherwise accesses for use. The external boundary threshold may indicate a number of points that are external to a boundary of the container, above which, the TMU may determine the absence of a container within the captured image.

For example, the external boundary threshold may be 35,000 points. The external boundary threshold may accommodate noise, such that if the TMU determines that the number of points that are external to a boundary of the container exceeds the external boundary threshold (e.g., 35,000 points), then the TMU may conclude that signal noise is not creating a false positive result indicating the absence of a container. Moreover, the external boundary threshold may be included in an external boundary threshold bank (e.g., stored in memory 304 and/or accessed from external source via networking interface 306) containing a respective external boundary threshold corresponding to each respective container type. In these embodiments, the number of points that are external to a boundary of the container may be, for example, the first image component 702a, and the external boundary threshold may be the first threshold value 704a. It will be appreciated that the number of points that are external to a boundary of the container and the external boundary threshold may be any image component (702a-k) and threshold value (704a-k), respectively.

In embodiments, block 406 further includes comparing the height of the ground plane to a height threshold. For example, in embodiments where the TMU may determine a height of a ground plane of an image, the TMU may compare this height of the ground plane to the height threshold. The height threshold may be a pre-configured threshold that the TMU stores in memory (e.g., memory 304), receives from an external source (e.g., via networking interface 306), and/or otherwise accesses for use. The height threshold may indicate an expected height of a parking lot/loading facility floor/other suitable ground plane, substantially similar to which, the TMU may determine the absence of a container within the captured image. For example, the height threshold may be 10 feet, or any other suitable value.

The height threshold may include or otherwise be associated with a similarity value indicating a tolerance, within which, the height of the ground plane may be said to be "substantially similar" to the height threshold. For example, the similarity value may be 6 inches, such that if the height of the ground plane is equal to or within 6 inches of the height threshold, the height of the ground plane is substantially similar to the height threshold. Thus, in this example, if the height of ground plane is 10 feet and 4 inches or 9 feet and 8 inches, the height of the ground plane may be substantially similar to the height threshold. By contrast, in this example, if the height of the ground plane is 6 feet and 6 inches or 0 inches, the height of the ground plane may not be substantially similar to the height threshold.

In embodiments, the height threshold may correspond to the expected height of the ground plane of a container, against which, the height of the ground plane may be compared. It should be understood that because the height threshold may correspond to the expected height of the ground plane of a container the height threshold may vary in accordance with the container detected within the image. In any event, the height threshold and an associated similarity value may be included in a height threshold bank (e.g., stored in memory 304 and/or accessed from external source via networking interface 306) containing a respective height threshold and/or similarity value corresponding to each respective container type, parking lot, loading facility floor, and/or other suitable surface. In these embodiments, the height of the ground plane may be, for example, the second image component 702b, and the height threshold may be the second threshold value 704b. It will be appreciated that the height of the ground plane and the height threshold may be any image component (702a-k) and threshold value (704a-k), respectively.

In embodiments, the height threshold may correspond to a first distance from the TMU. Above the first distance, the TMU may determine that the height of the ground plane corresponds to a parking lot/loading facility floor because the parking lot/loading facility floor may typically be further from the TMU than a floor associated with a container. Below the first distance, the TMU may determine that the height of the ground plane corresponds to a container because the container may typically be closer to the TMU than a ground plane associated with a parking lot/loading facility floor.

In embodiments, block 406 further includes comparing the average amplitude to an amplitude threshold. For example, in embodiments where the TMU may determine an average amplitude, the TMU may compare this average amplitude to the amplitude threshold. The amplitude threshold may be a pre-configured threshold that the TMU stores in memory (e.g., memory 304), receives from an external source (e.g., via networking interface 306), and/or otherwise accesses for use. The amplitude threshold may indicate an amplitude value, below which, the TMU may determine the absence of a container within the captured image.

For example, the amplitude threshold may be 100 dBm (decibel-milliwatts), or any other suitable value with any suitable units. It should be understood that because the amplitude threshold may correspond to the expected average amplitude of an image featuring a container, the amplitude threshold may vary in accordance with the container detected within the image. For example, a container with translucent walls may not reflect the light emitted from the ToF sensor as readily as a container with opaque walls, resulting in a lower average amplitude for the translucent container. Thus, the amplitude threshold may be included in an amplitude threshold bank (e.g., stored in memory 304 and/or accessed from external source via networking interface 306) containing a respective amplitude threshold corresponding to each respective container type. In these embodiments, the average amplitude may be, for example, the third image component 702c, and the amplitude threshold may be the third threshold value 704c. It will be appreciated that the average amplitude and the amplitude threshold may be any image component (702a-k) and threshold value (704a-k), respectively.

In embodiments, block 406 further includes comparing the average ambient value to an ambient value threshold. For example, in embodiments where the TMU may determine an average ambient value, the TMU may compare this average ambient value to the ambient value threshold. The ambient value threshold may be a pre-configured threshold that the TMU stores in memory (e.g., memory 304), receives from an external source (e.g., via networking interface 306), and/or otherwise accesses for use. The ambient value threshold may indicate an ambient value, above which, the TMU may determine the absence of a container within the captured image.

For example, the ambient value threshold may be 100 dBm, or any other suitable value. It should be understood that because the ambient value threshold may correspond to the expected average ambient value of an image featuring a container, the ambient value threshold may vary in accordance with the container detected within the image. For example, a container with translucent walls may not block ambient light as readily as a container with opaque walls, resulting in a lower average ambient value for the translucent container. Thus, the ambient value threshold may be included in an ambient value threshold bank (e.g., stored in memory 304 and/or accessed from external source via networking interface 306) containing a respective ambient value threshold corresponding to each respective container type. In these embodiments, the average ambient value may be, for example, the $K^{th}$ image component 702k, and the ambient value threshold may be the $K^{th}$ threshold value 704k. It will be appreciated that the average ambient value and the ambient value threshold may be any image component (702a-k) and threshold value (704a-k), respectively.

Figure 7:
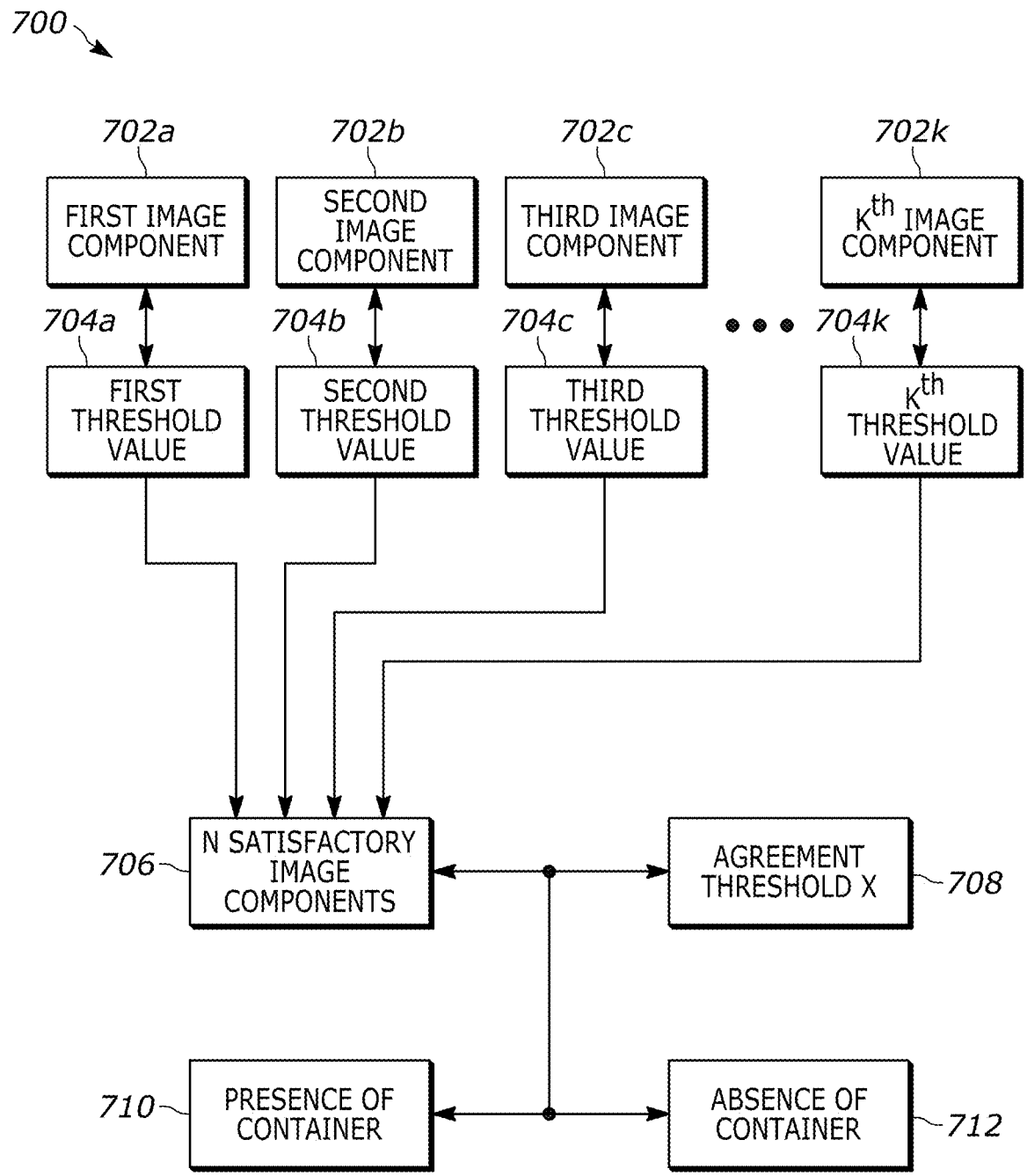
FIG. 7 is a flowchart representative of an image analysis technique utilized in the method of FIG. 4, and in accordance with embodiments described herein.

The method 400 continues by determining that a number of image components N 706 of the plurality of image components satisfy the respective threshold values (block 408). As illustrated in FIG. 7, the total number of image components and threshold values is represented by the value K, where K is some number greater than or equal to 2. Thus, the value N 706 represents a subset of the value K because the TMU or other suitable processor may determine that less than all respective image components 702a-k satisfy their corresponding respective threshold values 704a-k. Generally speaking, the TMU or other suitable processor may determine that a respective image component satisfies the corresponding respective threshold value by comparing the respective image component to the corresponding respective threshold value. Block 408 may be performed by, for example, the processing board 258 of FIG. 2.

In embodiments, block 408 further includes determining that the number of points that are external to the boundary of the container is greater than or equal to the external boundary threshold. For example, the TMU may determine that 40,000 points included in the plurality of points are external to a boundary of the container. As previously mentioned, the external boundary threshold may be 35,000 points. Thus, the TMU may determine that the number of points that are external to the boundary of the container satisfies the external boundary threshold because the number of points that are external to the boundary of the container is greater than the external boundary threshold. In this situation, the TMU may increase the number of satisfactory image components N 706.

Alternatively, if the TMU determines that the number of points that are external to the boundary of the container is 30,000, then the TMU may not increase the number of satisfactory image components N 706 because the number of points that are external to the boundary of the container does not exceed the external boundary threshold. The TMU may make this determination because a low number of points that are external to a boundary of the container may generally indicate that the light signals emitted by the ToF sensor are reflecting from interior container surfaces, such that a container is present (e.g., the container interior illustrated in the RGB trailer image 500 and the corresponding 3D trailer image 502).

In embodiments, block 408 further includes determining that the height of the ground plane is substantially similar to the height threshold. For example, the TMU may determine that the height of the ground plane is 6 feet. As previously mentioned, the height threshold may correspond to an expected height of a parking lot/loading facility floor with respect to the TMU, such as 10 feet. Thus, the TMU may determine that the height of the ground plane does not satisfy the height threshold because the height of the ground plane is not substantially similar to the height threshold, as described above. In this situation, the TMU may not increase the number of satisfactory image components N 706. Additionally or alternatively, the height threshold may correspond to the expected height of the ground plane of a container, such that the height of the ground plane may satisfy the height threshold by being substantially different than the height threshold.

Alternatively, if the TMU determines that the height of the ground plane is 10 feet, then the TMU may increase the number of satisfactory image components N 706 because the height of the ground plane is substantially similar to the height threshold. The TMU may make this determination because a low height of the ground plane may indicate that the determined ground plane does not correspond to a ground plane of a parking lot/loading facility floor, which generally indicates that a container is present (e.g., the container interior illustrated in the RGB trailer image 500 and the corresponding 3D trailer image 502). By contrast, a high height of the ground plane may indicate that the determined ground plane corresponds to the ground plane of a parking lot/loading facility floor, which generally indicates that no container is present (e.g., the empty loading bay illustrated in the RGB image 508 and the corresponding 3D image 510).

Moreover, it should be understood that the TMU may increase the number of satisfactory image components N 706 based on whether the height of the ground plane is greater than, less then, or any other suitable comparison to the height threshold. For example, the TMU may retrieve, determine, or otherwise access a height threshold of 8 feet, such that if the height of the ground plane is greater than the height threshold, the TMU may determine the absence of a container. Similarly, if the TMU determines that the height of the ground plane is less than the height threshold, the TMU may determine the presence of a container. In reference to the above example, the TMU may determine that the height of the ground plane is 10 feet. Hence, when the TMU compares the height of the ground plane to the height threshold, the TMU may determine that absence of a container because the height of the ground plane is greater than the height threshold.

In embodiments, block 408 further includes determining that the average amplitude does not exceed the amplitude threshold. For example, the TMU may determine that the average amplitude is 50 dBm, and the TMU may access, retrieve, or otherwise determine that the amplitude threshold is 100 dBm. Thus, the TMU may determine that the average amplitude satisfies the amplitude threshold because the average amplitude does not exceed the amplitude threshold. In this situation, the TMU may increase the number of satisfactory image components N 706.

Alternatively, if the TMU determines that the average amplitude is 150 dBm, then the TMU may not increase the number of satisfactory image components N 706 because the average amplitude exceeds the amplitude threshold. The TMU may make this determination because a high average amplitude corresponds to a low saturation from an external light source (e.g., sunlight), which generally indicates that a container is present (e.g., the container interior illustrated in the RGB trailer image 500 and the corresponding 3D trailer image 502).

In embodiments, block 408 further includes determining that the average ambient value is less than the ambient value threshold. For example, the TMU may determine that the average ambient value is 50 dBm, and the TMU may access, retrieve, or otherwise determine that the ambient value threshold is 100 dBm. Thus, the TMU may determine that the average ambient value satisfies the ambient value threshold because the average ambient value is less than the ambient threshold. In this situation, the TMU may increase the number of satisfactory image components N 706.

Alternatively, if the TMU determines that the average ambient value is 150 dBm, then the TMU may not increase the number of satisfactory image components N 706 because the average ambient value exceeds the ambient value threshold. The TMU may make this determination because a high average ambient value corresponds to a low average RGB value, which generally indicates that a container is present (e.g., the container interior illustrated in the RGB trailer image 500 and the corresponding 3D trailer image 502).

The method 400 continues by determining the presence or the absence of the container by comparing the number of satisfactory image components N 706 to an agreement threshold X 708 (block 410). The TMU or other suitable processor may access, retrieve, or otherwise determine the agreement threshold X 708. For example the agreement threshold X 708 may be a pre-configured threshold that the TMU stores in memory (e.g., memory 304), receives from an external source (e.g., via networking interface 306), and/or otherwise accesses for use. Block 410 may be performed by, for example, the processing board 258 of FIG. 2.

Generally speaking, the agreement threshold X 708 may represent the number of satisfactory image components N 706 necessary for the TMU to determine the presence or the absence of a container (710, 712) within the analyzed image. Agreement thresholds X 708 may vary depending on the number of image components analyzed for any given image (e.g., K). Moreover, each container type may correspond to a unique agreement threshold X 708, or multiple container types may correspond to one or more agreement thresholds X 708. For example, a container with a drop-frame configuration may not have a reliable height of a ground plane because the container may potentially include multiple ground planes comprising the floor of the container at any given time, as previously described. Thus, the TMU may not include the height of the ground plane as an image component, and correspondingly, the agreement threshold X 708 may be lowered to reflect the exclusion of the height of the ground plane as a viable image component.

It is to be understood that the type of container may be manually specified prior to any steps of the method 400 taking place, such that the TMU may access, retrieve, or otherwise determine each value described herein that may be specific to a type of container (e.g., K, X 708). For example, a manager of a loading facility (e.g., loading facility 100) may expect a particular loading bay (e.g., loading bay 106.3) to receive a specific container type over a known duration (e.g., straight rail semi-trailers for a week). Thus, the manager or other operator may provide a control signal to the TMU associated with the particular loading bay to analyze captured images with values corresponding to the specific container type.

Additionally or alternatively, the TMU may have a hard-coded set of instructions to automatically apply a set of predetermined values during the image analysis process described herein, regardless of the type of container present or expected. Further, in embodiments, the TMU may predict a container type based on data such as time of day, time of year, or any other suitable data as received from internal components (e.g., memory 304) or as received from an external source (e.g., via networking interface 306). In these embodiments, the TMU may further access, retrieve, or otherwise determine values specific to the predicted container type (e.g., K, X 708) based on stored values corresponding to the predicted container type, or based on a prediction model stored in memory (e.g., memory 304). The TMU may use the prediction model to generate values specific to the predicted container type based on prior predictions and prior indications of correct analyses regarding the presence or absence of the predicted container type.

In embodiments, block 410 further includes determining either (i) that the number of satisfactory image components N 706 is greater than or equal to the agreement threshold X or (ii) that the number of satisfactory image components N 706 is less than the agreement threshold X. Further in these embodiments, block 410 may include determining the absence of the container 712 in response to determining that the number of satisfactory image components N 706 is greater than or equal to the agreement threshold X. Still further in these embodiments, block 410 may include determining the presence of the container 710 in response to determining that the number of satisfactory image components N 706 is less than the agreement threshold X.

For example, assume that an image captured by the ToF sensor is analyzed by the TMU, and the TMU determines 5 image components corresponding to the image (e.g., K=5) based on the expected/predicted type of container. The TMU may further determine that 2 of the 5 image components satisfy their respective threshold values (e.g., N=2). The TMU may also access, retrieve, or otherwise determine that at least 3 image components must satisfy their respective threshold values to determine the absence of a container in the image (e.g., X=3). Thus, in this example, the TMU may determine the presence of a container 710 in the image because the number of image components satisfying their respective threshold values N 706 is less than the agreement threshold X (e.g., N<X). Alternatively, if the TMU determines that 4 of the 5 image components satisfy their respective threshold values, the TMU may determine the absence of a container 712 because the number of image components satisfying their respective threshold values N 706 is greater than or equal to the agreement threshold X (e.g., N X).

It is to be appreciated that the TMU may determine the presence/absence of a container based on any suitable comparison of the number of satisfactory image components N 706 to the agreement threshold X. For example, in embodiments, the TMU may determine the presence of a container by determining that the number of satisfactory image components N 706 is greater than or equal to the agreement threshold X. The TMU may further determine the absence of a container by determining that the number of satisfactory image components N 706 is less than to the agreement threshold X.

Accordingly, it is to be understood that each of the image component thresholds (e.g., height threshold, amplitude threshold, ambient value threshold, etc.) and their respective comparisons (e.g., less than, greater than, etc.) may be adjusted to suit the overall comparison of the number of satisfactory image components N 706 to the agreement threshold X. For example, assume that the TMU may determine the presence of a container by determining that the number of satisfactory image components N 706 is greater than or equal to the agreement threshold X. In this example, an image component may "satisfy" its respective threshold value when the image component indicates the presence of a container. If the height of the ground plane is not substantially similar to, or in embodiments, is less than the height threshold, the height of the ground plane may "satisfy" the height threshold because the height of the ground plane indicates the presence of a container. Similarly, each respective image component may "satisfy" its respective threshold value (and increase the number of satisfactory image components N 706) when each respective image component indicates the presence of a container.

The TMU may then utilize the determination of the presence or the absence of the container for any suitable purpose. For example, the TMU may internally store the determination (e.g., in memory 304) and further determine whether to calculate load metrics or other analytics. If the TMU determines the presence of a container, the TMU may further determine whether to begin/continue calculating load metrics, whether to skip calculating load metrics altogether, whether to recalculate the dimensions of the container, and/or any other suitable determination, calculation, or analysis or combination thereof.

Additionally or alternatively, the TMU may generate and transmit (e.g., via networking interface 306) a load status signal to an external device (e.g., external server, client device 204, etc.). The load status signal may include, for example, the determination of the presence or the absence of the container, and/or any load metrics or analytics calculated by the TMU. The external device may store the received load status signal and/or utilize the load status signal when performing additional routines associated with loading metrics and/or other analytics. For example, the external device may utilize the load status signal as part of a timeline segmentation routine configured to calculate, organize, format, and/or otherwise present loading metrics or other analytics data corresponding to a container loading session.

As previously mentioned, the loading metrics calculated for a particular container may be displayed to a user, operator, or other personnel during and/or after the container is loaded/unloaded (e.g., during/after the container "loading session"). The external device (e.g., client device 204) may utilize a timeline segmentation routine to display this information, by formatting the loading metrics in accordance with a timeline corresponding to the loading session to, for example, reflect the changing load status of the container over time. Moreover, the external device executing the timeline segmentation routine may selectively display loading metrics, such that if the external device receives an indication of the absence of a container (e.g., via a received load status signal), the timeline segmentation routine may instruct the external device to stop displaying load metrics, identify/label the displayed load metrics as associated with an absent container, and/or otherwise indicate the absence of the container.

However, if the presence or absence of the container is not accurately determined, the loading metrics associated with the container may be skewed or otherwise impacted. Namely, if the TMU determines the presence of a container when the container is, in fact, absent, the TMU may continue to calculate load metrics and any other suitable analytics, such that the timeline and any information displayed corresponding to the load status of the container may be incorrect. Accordingly, the external device may utilize the load status signal to more accurately display load metrics received from the TMU, and identify load metrics calculated during the absence of a container that may be excluded from display and/or any calculations of aggregate load metrics/statistics corresponding to a container.

In this manner, the methods and systems of the present disclosure achieve notable improvements over conventional methods and systems. For example, unlike conventional methods and systems for identifying the presence or absence of a container, the methods and systems of the present disclosure analyze multiple image components to determine the presence or absence of a container. This analysis allows the methods and systems of the present disclosure to minimize the impact of false positives and false negatives attributable to any particular image component, as described herein. Moreover, utilizing multiple image components in this manner allows the methods and systems of the present disclosure to more accurately determine whether a container is present or absent from the FOV of the ToF sensor or any other suitable imaging system/apparatus.

Consequently, the methods and systems of the present disclosure solve the problems associated with conventional methods and systems. By more accurately identifying the presence or absence of containers within the FOV of the ToF sensor, the methods and systems of the present disclosure decrease the amount of wasted processing time and resources of processing instrumentation (e.g., TMU 112.3) attempting to process load metrics of containers that are not present in the FOV. This, in turn, increases the accuracy of statistics (e.g., load metrics) shipping companies may maintain concerning their loading facilities, and increases overall customer satisfaction because the statistics presented to customers will not contain any erratic, unintelligible, or otherwise flawed data.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above. Furthermore, the term "trailer" is an example of application of a container, in particular, a container used with a vehicle, such as a powered vehicle, like a delivery truck, box truck, etc.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for detecting a presence or an absence of a container, comprising:
capturing a three-dimensional image, the three-dimensional image comprising three-dimensional point data having a plurality of points;
analyzing the plurality of points to determine a plurality of image components, each image component being representative of the plurality of points;
comparing each image component of the plurality of image components to a threshold value, wherein each image component corresponds to a respective threshold value;
determining that a number of image components N of the plurality of image components satisfy the respective threshold values; and
determining the presence or absence of the container by comparing the number of image components N to an agreement threshold X,
wherein analyzing the plurality of points to determine the plurality of image components further comprises performing planar segmentation on the plurality of points to determine a height of a ground plane, and
wherein comparing each image component of the plurality of image components to the threshold value further comprises comparing the height of the ground plane to a height threshold.

2. The method of claim 1, wherein analyzing the plurality of points to determine the plurality of image components further comprises iterating over the plurality of points to determine a number of points that are external to a boundary of the container; and
wherein comparing each image component of the plurality of image components to the threshold value further comprises comparing the number of points that are external to the boundary of the container to an external boundary threshold.

3. The method of claim 2, wherein determining that the number of image components N of the plurality of image components satisfy the respective threshold values further comprises determining that the number of points that are external to the boundary of the container is greater than or equal to the external boundary threshold.

4. The method of claim 1, wherein determining that the number of image components N of the plurality of image components satisfy the respective threshold values further comprises determining that the height of the ground plane is substantially similar to the height threshold.

5. The method of claim 1, wherein analyzing the plurality of points to determine the plurality of image components further comprises determining an amplitude for each point in the plurality of points to calculate an average amplitude of the plurality of points; and
wherein comparing each image component of the plurality of image components to the threshold value further comprises comparing the average amplitude to an amplitude threshold.

6. The method of claim 5, wherein determining that the number of image components N of the plurality of image components satisfy the respective threshold values further comprises determining that the average amplitude is less than the amplitude threshold.

7. The method of claim 1, wherein analyzing the plurality of points to determine the plurality of image components further comprises determining an ambient value for each point in the plurality of points to calculate an average ambient value of the plurality of points; and
wherein comparing each image component of the plurality of image components to the threshold value further comprises comparing the average ambient value to an ambient value threshold.

8. The method of claim 7, wherein determining that the number of image components N of the plurality of image components satisfy the respective threshold values further comprises determining that the average ambient value is less than the ambient value threshold.

9. The method of claim 1, further comprising:
determining either (i) that the number of image components N is greater than or equal to the agreement threshold X or (ii) that the number of image components N is less than the agreement threshold X;
in response to determining that the number of image components N is greater than or equal to the agreement threshold X, determining the absence of the container; and
in response to determining that the number of image components N is less than the agreement threshold X, determining the presence of the container.

10. The method of claim 1, further comprising:
generating a load status signal including an indication of either (i) the presence of the container, or (ii) the absence of the container;
responsive to determining the presence of the container:
calculating a load status of the container, and incorporating the load status of the container into the load status signal; and transmitting the load status signal to an external device for display to a user in accordance with a timeline segmentation routine.

11. A system for determining a presence or an absence of a container, comprising:
- a user interface; and
- a trailer monitoring unit (TMU) mounted proximate a loading bay and communicatively connected with the user interface, the TMU including:
  - a housing; and
  - an imaging assembly at least partially within the housing and configured to capture a three-dimensional image, the three-dimensional image comprising three-dimensional point data having a plurality of points;
- wherein the TMU is configured to:
  - analyze the plurality of points to determine a plurality of image components by performing planar segmentation on the plurality of points, each image component being representative of the plurality of points;
  - determine a height of a ground plane resulting from the planar segmentation;
  - compare each image component of the plurality of image components to a threshold value by comparing the height of the ground plane to a height threshold, wherein each image component corresponds to a respective threshold value;
  - determine that a number of image components N of the plurality of image components satisfy the respective threshold values; and
  - determine the presence or absence of the container by comparing the number of image components N to an agreement threshold X.

12. The system of claim 11, wherein the TMU is further configured to:
- analyze the plurality of points to determine the plurality of image components by iterating over the plurality of points to determine a number of points that are external to a boundary of the container; and
- compare each image component of the plurality of image components to the threshold value by comparing the number of points that are external to the boundary of the container to an external boundary threshold.

13. The system of claim 12, wherein the TMU is further configured to:
- determine that the number of image components N of the plurality of image components satisfy the respective threshold values by determining that the number of points that are external to the boundary of the container is greater than or equal to the external boundary threshold.

14. The system of claim 11, wherein the TMU is further configured to:
- determining that the number of image components N of the plurality of image components satisfy the respective threshold values further comprises determining that the height of the ground plane is substantially similar to the height threshold.

15. The system of claim 11, wherein the TMU is further configured to:
- analyze the plurality of points to determine the plurality of image components by determining an amplitude for each point in the plurality of points;
- calculate an average amplitude of the plurality of points; and
- compare each image component of the plurality of image components to the respective threshold value by comparing the average amplitude to an amplitude threshold.

16. The system of claim 15, wherein the TMU is further configured to:
- determine that the number of image components N of the plurality of image components satisfy the respective threshold values by determining that the average amplitude is less than the amplitude threshold.

17. The system of claim 11, wherein the TMU is further configured to:
- analyze the plurality of points to determine the plurality of image components by determining an ambient value for each point in the plurality of points;
- calculate an average ambient value of the plurality of points; and
- compare each image component of the plurality of image components to the respective threshold value by comparing the average ambient value to an ambient value threshold.

18. The system of claim 17, wherein the TMU is further configured to:
- determine that the number of image components N of the plurality of image components satisfy the respective threshold values by determining that the average ambient value is less than the ambient value threshold.

19. The system of claim 11, wherein the TMU is further configured to:
- determine either (i) that the number of image components N is greater than or equal to the agreement threshold X or (ii) that the number of image components N is less than the agreement threshold X;
- in response to determining that the number of image components N is greater than or equal to the agreement threshold X, determine the absence of the container; and
- in response to determining that the number of image components N is less than the agreement threshold X, determine the presence of the container.

20. The system of claim 11, wherein the TMU is further configured to:
- generate a load status signal including an indication of either (i) the presence of the container, or (ii) the absence of the container;
- responsive to determining the presence of the container:
  - calculate a load status of the container, and
  - incorporate the load status of the container into the load status signal; and
- transmit the load status signal to an external device for display to a user in accordance with a timeline segmentation routine.

* * * * *